H. W. CHENEY.
SYSTEM OF DISTRIBUTION.
APPLICATION FILED JULY 26, 1915.

1,287,226.  Patented Dec. 10, 1918.

Inventor
H. W. Cheney
by
Attorney

UNITED STATES PATENT OFFICE.

HERBERT W. CHENEY, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SYSTEM OF DISTRIBUTION.

1,287,226.

Specification of Letters Patent.  Patented Dec. 10, 1918.

Application filed July 26, 1915.  Serial No. 42,444.

*To all whom it may concern:*

Be it known that I, HERBERT W. CHENEY, a citizen of the United States, residing at Milwaukee, in the county of Milwaukee and State of Wisconsin, have invented a certain new and useful Improvement in Systems of Distribution, of which the following is a specification.

This invention relates in general to electrical distribution systems, and has particular relation to devices for regulating generators connected to supply variable loads, especially where there is a tendency for a generator to operate at widely different speeds.

In certain installations, as where a steam turbine drives a generator, usually through a direct connection therewith, for supplying a variable load, as for supplying lamps on a locomotive, such as the head-light and the cab lights, some means are necessary to limit the speed of the turbine on the loss of a portion of the generator load or an increase of the steam pressure at the turbine inlet. It will be obvious that, if the generator were permitted to operate at an increased speed, when a portion of its normal load is removed or the inlet pressure is increased, unless the generator field be regulated to maintain the voltage at the proper point, the voltage on the translating devices constituting the load would rise to a dangerously high value, and this is especially the case where the load comprises lamps of the incandescent type where a voltage variation of from 5 to 10 per cent. is highly injurious to the life of the lamps.

In accordance with this invention, improved means are provided for regulating the output of a generator, the general operating effect of the regulating means provided being to maintain a characteristic of the energy supplied by the generator substantially constant independently of the speed thereof and to provide for this purpose an artificial load which takes the place of that portion of the lamp load removed from circuit or compensates for an increase in pressure of the working fluid that operates the generator-driving means, and acts to hold down the speed of such generator-driving means. This regulation may be effected in response to voltage or current, that is, slight changes in these energy characteristics may be effective to check great ones, the final regulation functioning to maintain approximately constant the desired energy characteristic.

It is an object of this invention to provide a system of distribution comprising a generator driven by means which inherently functions to increase its speed on loss of load or increase in pressure of the working fluid and supplying a load of a variable character, and improved means for maintaining a characteristic of the energy supplied by said generator within desired limits independently of the load or the pressure or other variable characteristic of the working fluid operating the generator-driving means.

It is a further object of this invention to provide an improved regulating device for the system described, comprising a retarding brake which acts as an artificial load on the generator-driving means.

It is a further object of this invention to provide an improved regulating device for the system described comprising a brake forming an artificial load for the generator-driving means, in combination with means for regulating the field of the generator supplying the load.

These and other objects are attained by this invention, the various novel features of which will appear from the description and drawings, disclosing one embodiment of such invention, and will be particularly pointed out in the claims.

Figure 1:
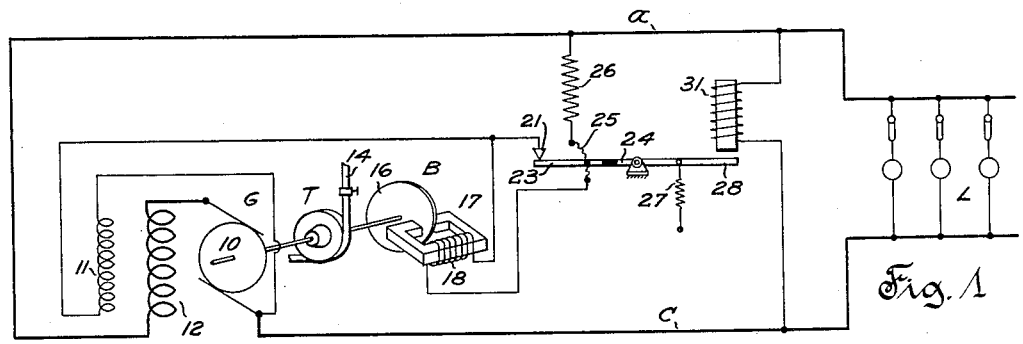
Figure 1 is a diagrammatic view of a system embodying features of this invention.

In accordance with the drawings, a generator G, shown diagrammatically, is driven by a prime mover, such as a turbine T, being preferably mounted on the same shaft therewith. The armature of the generator is indicated at 10, the shunt field at 11, and the series field at 12, the machine terminals being properly connected to the distribution circuit *a, c*. The turbine T is provided with an inlet 14 of adjustable size, although, in the ordinary operation of the system, the inlet opening remains constant when once adjusted, this adjustment depending on the normal generator speed desired and the normal working pressure on the turbine inlet.

A brake B is provided so as to act as an artificial load on the turbine, this brake comprising a disk 16 of conductive material which rotates between the poles of a magnet 17 energized by a winding 18, the disk 16 being shown as mounted on the same shaft with the generator and turbine.

One terminal of the shunt winding 11 and a terminal of the brake-energizing winding 18 are connected to a fixed contact 21. A contact portion 23 carried by a pivoted lever 24 is adapted to engage the fixed contact 21 to complete a circuit from the aforesaid terminals of the shunt winding 11 and the brake-energizing winding 18, through a flexible conductor 25, to one side of the distribution circuit $a$, $c$, a resistance 26 being inserted in this connection, if desired. The other terminal of the brake-energizing winding 18 is permanently connected to the contact portion 23, the latter being normally held in engagement with the contact 21 by a spring 27, secured at one end to the lever and at the other end to a fixed point. An armature portion 28 of the lever 24 is adapted to be attracted by a magnet 31, thus causing a breaking of the circuit between the contact portion 23 and the contact 21. As disclosed, this magnet 31 is of the voltage type, the terminals of the energizing winding thereof being connected across the sides of the distribution circuit $a$, $c$, the latter being shown as supplying a plurality of lamps or other translating devices constituting a load of a variable nature.

In the ordinary operation of the system, the inlet 14 of the turbine T is adjusted to cause the turbine to operate at such speed as causes the generator G to produce current of the desired voltage with the normal load connected in circuit and the lowest ordinary working pressure on the turbine inlet, the connections at this time being as shown in Fig. 1. It will be apparent that, due to the inherent characteristics of the turbine, with a definite inlet opening, which is to be assumed, the speed of the turbine will vary in the same sense as the pressure of working fluid at the turbine inlet and inversely as the load thereon. Hence, the regulation provided must be such as will, with a definite inlet opening, properly compensate to maintain the voltage on the load substantially constant independently of the amount of this load and such variations in pressure of working fluid at the turbine inlet as may be encountered under ordinary conditions, these variations hardly exceeding twenty or twenty-five pounds.

When a portion of the normal load is removed, there is a tendency for the turbine to speed up, thus increasing the voltage on the generator terminals and on the distribution circuit. A slight increase in the voltage, due to the decrease in load, is sufficient to cause the magnet 31 to attract its armature 28, thus interrupting the normal short-circuit, through the contact 21 and contact portion 23 of the lever 24, about the brake-energizing winding 18. On such operation, the brake-energizing winding 18 is included in the circuit of the shunt winding 11, causing such increase in the resistance of the circuit of the shunt winding as to reduce the field energization of the generator G and to thus tend to reduce the voltage thereof, and, further, energization of the winding 18 creates such flux in the magnet 17 of the brake B as causes the brake to effect a decrease in the speed of the turbine. Likewise, when the increase in voltage is due to an increase in the pressure of working fluid at the turbine inlet, the action of the regulating means is similar in causing the brake to act as an artificial load on the turbine to thereby reduce the speed. By proper design of the brake B the effects produced on slight increase of line voltage above normal may be such as to produce such action of the regulating means as maintains the voltage on the load practically constant independently of the amount of such load or the pressure of working fluid at the turbine inlet.

Figure 2:
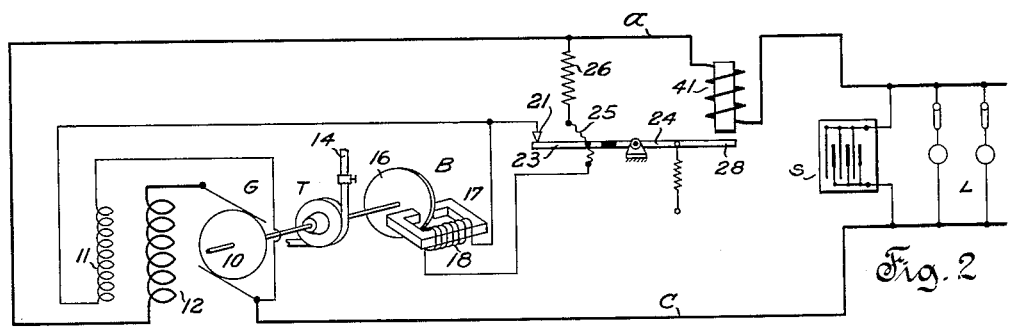
Fig. 2 is a diagrammatic view of a modification of the system shown in Fig. 1.

In the system disclosed in Fig. 2, a current responsive magnet 41 is substituted for the voltage responsive magnet 31, of the system of Fig. 1, this type of regulating means being used whenever it is desirable to regulate for constant current in the system rather than for constant voltage, this regulating scheme being most desirable where the load elements are arranged in series relation, or where, as indicated in the drawings, a device such as a secondary battery S is connected across the line, the battery taking that portion of the constant current not consumed by the lamps or other translating devices. The operation of this system is quite similar to that of Fig. 1, the regulating means functioning, on slight increase of current, to add the resistance of the brake winding to the circuit of the shunt field winding of the generator and to cause the brake to retard the turbine and the generator when the current in the circuit $a$, $c$ is slightly above normal, the general result being to maintain this current approximately constant at the desired normal value.

Figure 3:
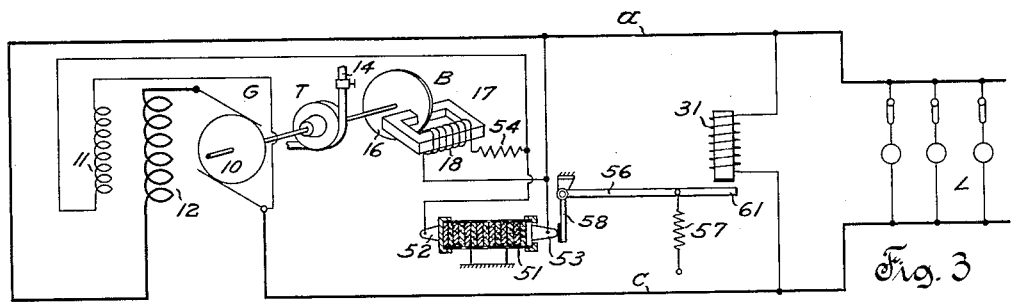
Figs. 3 and 4 are diagrammatic views of systems embodying modifications of the form of invention shown in Fig. 1.

In the system disclosed in Fig. 3, the circuit of the shunt winding 11 is normally made through a rheostat 51, preferably of the compressible type, this rheostat having terminals 52 and 53. One terminal of the brake-energizing winding 18 and a terminal of the field winding 11 are connected to the rheostat terminal 52 and the other terminal of the brake-energizing winding is connected to the rheostat terminal 53 and one side of the distribution system $a$, $c$, the connection of the brake-energizing winding to the terminal 52 being made through a resistance 54, if desired. The rheostat 51 is normally held in a compressed condition by the bell-crank lever 56, the latter being normally biased, as by a spring 57, to a position wherein an arm 58 bears on the terminal 53 and serves to compress the resistance elements of the rheostat. A voltage responsive magnet 31 is disposed in such position as to be capable of attracting an armature portion 61 of the lever 56, on sufficient energization of the winding of the magnet. The relative resistance of the rheostat 51, when in compressed condition, and the circuit of the brake-energizing winding 18 and the resistance 54 are such that the brake B exercises little or no retarding effect on the turbine shaft at this time.

In the system of Fig. 3, with a normal load on the distribution circuit, the operating parts are in the positions indicated, the brake B being ineffective, or practically so, through the practical short-circuiting of its energizing winding 18 by the compressible rheostat 51. On the removal of such an amount of load from the distribution circuit as causes an increase in speed of the turbine, or if the turbine speed increases for any other reason, as, for instance, increase of pressure on its inlet side, the generator voltage increases to such an extent that the magnet 31 attracts its armature 61 and thus relieves the elements of the rheostat 51 of pressure of the arm 58, thus increasing the resistance of this branch of the circuit to such an extent that the greater portion of the current in the circuit of the shunt winding 11 flows through the brake-energizing winding 18 and the resistance 54. This change in circuit conditions adds such resistance to the circuit of the shunt winding as to tend to cause voltage decrease; and, further, the energizing of the winding 18 causes the brake B to act as an artificial load to retard the turbine, the general effect being that the turbine speed is held at such a value as causes the production of normal voltage on the distribution circuit $a$, $c$.

It will be obvious that a current responsive magnet, similar to the magnet 41 of the system of Fig. 2, may be substituted for the voltage responsive magnet 31 whenever it is desired to regulate for constant current in the system rather than for constant voltage.

Figure 4:
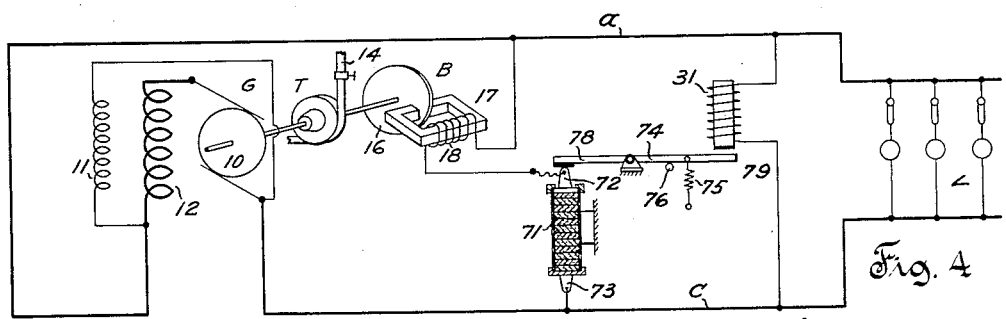

In the system disclosed in Fig. 4, regulation is accomplished independently of the field windings of the generator. One terminal of the brake-energizing winding 18 is connected to one side of the distribution circuit $a$, $c$ and the other side of this winding is connected to the other side of the circuit $a$, $c$ through the rheostat 71, the latter being provided with terminal portions 72 and 73. Under normal conditions, the elements of this rheostat 71 are not compressed, the circuit of the brake-energizing winding 18 being of such high resistance that comparatively no current flows therethrough whereby the brake B is rendered ineffective. A pivoted lever 74 is normally held against a fixed stop 76 and in such position that a portion 78 thereof is ineffective to compress the elements of the rheostat 71. An armature portion of this lever 74 is adapted to be attracted by a voltage responsive magnet 31, on sufficient energization of the winding thereof, to cause the portion 78 to compress the elements of the rheostat 71 and thus appreciably increase the current in the circuit of the brake-energizing winding 18, thereby rendering the brake operative as an artificial load on the turbine.

In the operation of the system of Fig. 4, with a normal load on the distribution circuit $a$, $c$, the parts are in the positions indicated. On any increase of turbine speed, due to the removal of a portion of the load L, or any other cause, the resulting increase in voltage causes operation of the lever 74 to compress the elements of the rheostat 71, such action causing sufficient current to flow through the winding 18 to produce an appreciable retarding effect of the brake B on the turbine. It will be apparent that the regulating elements of this system are effective to maintain the voltage approximately constant at the desired value.

It will be apparent that a current responsive magnet, similar to that indicated at 41 in Fig. 2, may be substituted for the voltage responsive magnet 31 whenever it is desirable to regulate for constant current instead of constant voltage.

It will be apparent that, in accordance with this invention a distribution system is provided wherein a brake is rendered effective to act as such an artificial load on the prime mover driving the generator supplying the system as causes the voltage or current of the system to be maintained substantially constant independently of variations in the load on the generator or variations in the pressure or other characteristic of the working fluid operating the generator-driving means.

It should be understood that it is not desired that the invention claimed be limited to the exact details of construction shown and described, for obvious modifications will occur to a person skilled in the art.

It is claimed and desired to secure by Letters Patent:

1. In combination, a generator connected to supply energy to a variable load, an electromagnetic brake associated with said generator, and means automatically operative in response to an operating characteristic of said generator for varying both the field excitation of said generator and the retarding effect of said brake.

2. In combination, a generator having a field, means for driving said generator, an electromagnetic brake for said driving means, said brake comprising an energizing winding, and control means responsive to an operating characteristic of said generator and operative through said field and through said brake-energizing winding for maintaining a characteristic of the energy furnished by said generator within predetermined limits.

3. In combination, a generator connected to supply energy to a variable load, an electromagnetic brake associated with said generator and comprising an energizing winding, said energizing winding being normally ineffective to cause braking action, and means automatically operative in response to an operating characteristic of said generator for varying the field excitation of said generator and rendering said brake winding effective.

4. In combination, a generator, a fluid-operated engine for driving said generator, an electromagnetic brake for retarding said engine, said brake including an energizing winding normally ineffective for brake-operating purposes, and means automatically operative in response to an abnormal operating condition of said generator for varying the field excitation of said generator and rendering said brake-energizing winding effective for brake-operating purposes.

5. In combination, a generator having a field, means for driving said generator, braking means for said driving means, said braking means including a normally short-circuited energizing winding, and means automatically operative in response to an operating characteristic of said generator for causing the inclusion of said field in circuit with said brake-energizing winding.

6. In combination, a generator having a field, means for driving said generator, a brake associated with said generator, and means comprising a common operating element for controlling said brake and said field to maintain substantially constant a characteristic of the energy supplied by said generator.

7. In combination, a generator, an electromagnetic brake associated with said generator and comprising an energizing winding, and control means responsive to an operating characteristic of said generator and effective under normal operating conditions to permit full excitation of said generator field and minimum effects due to said brake-energizing winding and under abnormal operating conditions to insure a reduced excitation of said generator field and an increased excitation of said brake-energizing winding.

8. In combination, a generator having a field, an electromagnetic brake associated with said generator and including an energizing winding normally inoperative for brake-operating purposes, said brake-energizing winding and a field winding on said generator being interconnected, and control means responsive to an abnormal value of an operating characteristic of said generator and effective to cause the inclusion of said brake-energizing winding in the circuit of said generator field to thereby effect reduced excitation of said generator field and to render said brake energizing-winding effective for brake-operating purposes.

9. A generator connected to supply a variable load, and a brake for said generator comprising an energizing winding, a variable resistance, and relatively movable parts one of which exerts an electromagnetic influence upon another, another of said parts comprising relatively movable portions at least one of which is automatically adjustable in response to an operating characteristic of said generator for varying the resistance in the circuit of said brake energizing winding for brake operating purposes.

10. A generator connected to supply a variable load, and a brake for said generator comprising an energizing winding, a variable resistance, and relatively movable parts one of which exerts an electromagnetic influence upon another, another of said parts comprising relatively movable portions at least one of which is automatically adjustable in response to an operating characteristic of said generator for varying both the resistance in the circuit of said brake energizing winding and the degree of said electromagnetic influence.

In testimony whereof, the signature of the inventor is affixed hereto.

HERBERT W. CHENEY.